(12) United States Patent
Williams

(10) Patent No.: US 9,761,154 B2
(45) Date of Patent: Sep. 12, 2017

(54) TRACHEOSTOMY TRAINER DEVICE AND RELATED METHOD THEREOF

(71) Applicant: Elissa R. Williams, Valley Center, KS (US)

(72) Inventor: Elissa R. Williams, Valley Center, KS (US)

(73) Assignee: University of Virginia Patent Foundation, Charlottesville, VA (US)

( * ) Notice: Subject to any disclaimer, the term of this patent is extended or adjusted under 35 U.S.C. 154(b) by 330 days.

(21) Appl. No.: 14/286,475

(22) Filed: May 23, 2014

(65) Prior Publication Data

US 2015/0024361 A1 Jan. 22, 2015

Related U.S. Application Data

(60) Provisional application No. 61/826,716, filed on May 23, 2013.

(51) Int. Cl.
*G09B 23/00* (2006.01)
*G09B 23/28* (2006.01)

(52) U.S. Cl.
CPC ........... *G09B 23/288* (2013.01); *G09B 23/28* (2013.01); *G09B 23/00* (2013.01)

(58) Field of Classification Search
CPC .................................................. G09B 23/288
USPC .................... 434/265, 269, 262, 267, 272
See application file for complete search history.

(56) References Cited

U.S. PATENT DOCUMENTS

| | | | |
|---|---|---|---|
| 3,556,103 A * | 1/1971 | Calhoun | A61M 16/0472 128/200.26 |
| 4,817,598 A | 4/1989 | LaBombard | |
| 5,846,087 A * | 12/1998 | Scherer | G09B 23/285 434/267 |
| 6,662,804 B2 | 12/2003 | Ortiz | |
| 2007/0218438 A1* | 9/2007 | Sanders | G09B 23/30 434/236 |
| 2009/0176196 A1* | 7/2009 | Niblock | G09B 23/285 434/262 |
| 2012/0202180 A1 | 8/2012 | Stock et al. | |
| 2014/0017650 A1* | 1/2014 | Romero | G09B 23/30 434/270 |
| 2014/0051049 A1* | 2/2014 | Jarc | G09B 23/30 434/267 |

* cited by examiner

*Primary Examiner* — James Hull
(74) *Attorney, Agent, or Firm* — Robert J. Decker

(57) ABSTRACT

A training device and related method designed to provide a user or trainee with a realistic tactile sensation or feel for inserting a penetrating device, such as a tracheotomy tube, into the stoma of a subject. The device and method provides a means for providing the user with a high level of initial resistance followed by a relatively quick transition to a lower level of resistance. The resistance will change after the user has pushed the penetrating device past a certain threshold of force or displacement. The resulting transition to a lower level of force, or "pop", provides the user with a realistic feel to prepare them for procedures on the stoma of an actual subject. A user may then become acclimated to the feel of proper insertion technique. The training device may also be used to train care, cleaning, maintenance, suction, and ventilation of a subject as necessary.

23 Claims, 15 Drawing Sheets

TRACHEOSTOMY TRAINER DEVICE AND RELATED METHOD THEREOF

CROSS-REFERENCE TO RELATED APPLICATIONS

The present application claims benefit of priority under 35 U.S.C. §119(e) from U.S. Provisional Application Ser. No. 61/826,716, filed May 23, 2013, entitled "Tracheostomy Trainer Device and Related Method Thereof;" the disclosure of which is hereby incorporated by reference herein in its entirety.

TECHNICAL FIELD

This invention relates generally to the field of medical training devices. More specifically, the invention is directed towards a training device for lay people who may need to know how to care for a patient with a tracheostomy.

BACKGROUND

There are products on the market that allow a user to practice or be trained in tracheostomy care, but these products are aimed at creating a lifelike visual representation of the patient. However, the present inventor recognizes that it is important for a user or trainee to experience the tactile sensations of inserting a tracheotomy tube, and performing other procedures or activities regarding the tracheostomy. Also, the majority of products currently on the market are large, expensive, and bulky.

In summary, there is still a need for a tracheostomy trainer device that allows a user to gain experience in the tactile sensation of inserting a tracheotomy tube and in performing other procedures on a patient that has a tracheostomy.

OVERVIEW

A patient with a tracheostomy requires special care and attention. As a result, when a patient with a tracheostomy is discharged from the hospital, it is important that persons who will participate in the care of that patient are trained in proper insertion, removal, and maintenance of the tracheotomy tube that passes through the tracheostomy.

An aspect of an embodiment of the present invention device provides the user with an inexpensive, portable, and convenient method to practice insertion or cannulation of a tracheotomy tube into a tracheostomy. The device is intended to create a realistic feeling of insertion of the tracheostomy tube. In particular, the device is well suited for creating a high level of initial resistance that quickly transitions into a lower level of resistance once the tracheotomy tube has passed a certain level of force and insertion. The combination of a surface with an aperture with a diaphragm that provides either another aperture of smaller size or a slit valve allows for a staggered two-level resistance that is similar to that of an actual patient tracheostomy. This recreates the tactile sensations of insertion of a tracheotomy tube into a patient for the user providing a real-life feel. Furthermore, the tracheostomy trainer device is inexpensive to produce, portable, and may be provided as a self contained kit that is easily transported and stored. The device may be produced in a way so as to be light weight and hand held.

The device can also be used for a number of other procedures or activities that are necessary for a patient with a tracheostomy and tracheotomy tube. Procedures, in addition to insertion or cannulation, may include suction, ventilation, cleaning, care, and other maintenance procedures. The device allows the user to gain an appreciation and become acclimated to the feeling and tactile experience that they will encounter during the care of a patient.

An aspect of an embodiment of the present invention provides, but not limited thereto, a device for training an operator to care for a subject with a tracheostomy. The device may comprise: a rigid or semi-rigid surface; the surface containing at least one surface aperture; at least one diaphragm in communication with the rigid or semi-rigid surface; at least one diaphragm aperture in each of the at least one diaphragm; the at least one diaphragm aperture being smaller in size than the surface aperture; the at least one diaphragm aperture being configured for an interference fit with an outer portion of a tracheotomy tube or penetrating instrument; the interference fit configured to produce an initial resistance to insertion of the tracheotomy tube or penetrating instrument followed by lower resistance after the tracheotomy tube or penetrating instrument is displaced past a threshold of the at least one diaphragm aperture causing a sudden change in resistance; and the sudden change in resistance configured to provide the inexperienced operator with a tactile sensation similar to that of insertion of a tracheostomy tube into the tracheostomy of the subject.

An aspect of an embodiment of the present invention provides, but not limited thereto, a method for training an operator to care for a subject with a tracheostomy. The method may comprise: providing a rigid or semi-rigid surface; providing at least one diaphragm in communication with the rigid or semi-rigid surface, wherein the at least one diaphragm includes a diaphragm aperture; and inserting a tracheotomy tube or penetrating instrument into the at least one diaphragm aperture causing interference between the tracheotomy tube or penetrating instrument and the diaphragm, wherein the interference produces an initial resistance to insertion of the tracheotomy tube or penetrating instrument followed by lower resistance after the tracheotomy tube or penetrating instrument is displaced past a threshold of the at least one diaphragm aperture causing a sudden change in resistance.

An aspect of an embodiment of the present invention provides, but not limited thereto, a training device (and related method of use and manufacture) designed to provide a user or trainee with a realistic tactile sensation or feel for inserting a penetrating device, such as a tracheotomy tube, into the stoma of a subject. The device (and related method) provides a means for providing the user with a high level of initial resistance followed by a relatively quick transition to a lower level of resistance. The resistance will change after the user has pushed the penetrating device past a certain threshold of force or displacement. The resulting transition to a lower level of force, or "pop", provides the user with a realistic feel to prepare them for procedures on the stoma of an actual subject. A user may then become acclimated to the feel of proper insertion technique. The training device (and related method) may also be used to train care, cleaning, maintenance, suction, and ventilation of a subject as necessary.

These and other objects, along with advantages and features of various aspects of embodiments of the invention disclosed herein, will be made more apparent from the description, drawings and claims that follow.

BRIEF DESCRIPTION OF THE DRAWINGS

The accompanying drawings, which are not necessarily drawn to scale, and which are incorporated into and form a part of the instant specification, illustrate several aspects and embodiments of the present invention and, together with the description therein, serve to explain the principles of the invention. The drawings are provided only for the purpose of illustrating select embodiments of the invention and are not to be construed as limiting the invention.

DETAILED DESCRIPTION OF EXEMPLARY EMBODIMENTS

Figure 1:
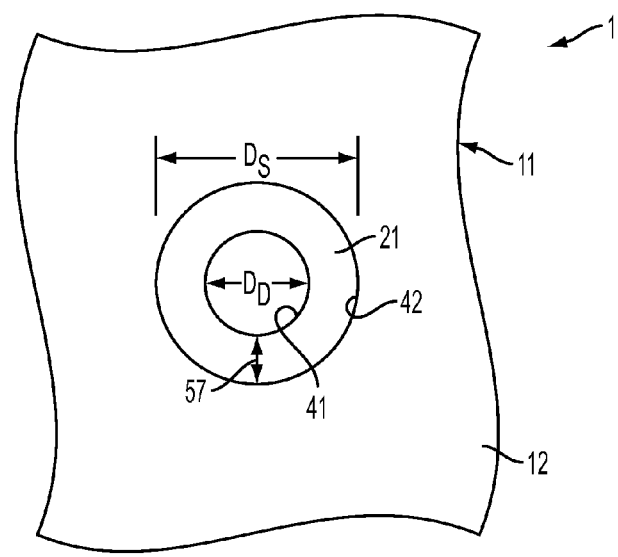
FIG. 1 provides a back view schematic illustration of an embodiment of the tracheostomy trainer device with a diaphragm.

FIG. 1 provides a back view schematic illustration of an aspect of an embodiment of the tracheostomy trainer device 1. The device 1 may be comprised of, but not limited to, a surface 11 having an outer side (not shown) and an inner side 12. The surface 11 has a surface aperture 42 having a diameter $D_S$ in communication with a diaphragm 21, which has a diaphragm aperture 41 having a diameter $D_D$. In this illustration, the diaphragm 21 is in communication with the outer side of the surface 11, and the view is taken from the direction of the inner side 12 (or back side). Diameters $D_S$ and $D_D$ are related in that $D_S$ is larger than $D_D$ providing for a delta 57 between $D_S$ and $D_D$. The delta may be increased or decreased as desired or required for carrying out the aspects of the various embodiments of the invention disclosed herein.

Figure 2:
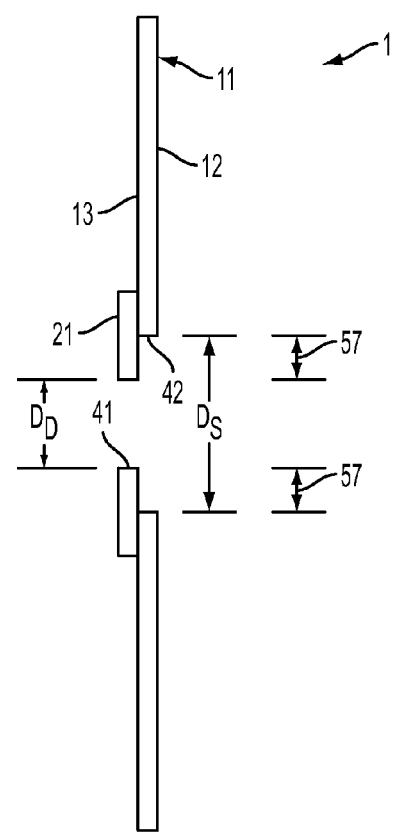
FIG. 2 provides a side view schematic illustration of an embodiment of the tracheostomy trainer device with a diaphragm.

FIG. 2 provides a schematic illustration of a side sectional view of an aspect of an embodiment of the device 1. Shown from the side, the inner side 12 and outer side 13 of the surface 11 are visible. Here, it can be seen that the surface 11 has a surface aperture 42 having a diameter of $D_S$. The surface aperture 42 is in communication with the diaphragm 21, which has its own diaphragm aperture 41, also having a diameter of $D_D$. In this view, it can be more clearly seen that the surface aperture 42 is larger than the diaphragm aperture 41 which creates a delta 57 between the surface aperture 42 and the diaphragm aperture 41. Said differently, it can be seen that $D_S$ is larger than $D_D$ creating the delta 57.

Referring to both FIG. 1 and FIG. 2, it should be appreciated that there are a number of suitable materials that can be used to construct both the surface 11 and the diaphragm 21. The list of possible materials may include, but is not limited to, metals, ceramics, glass, plastics, polymers, rubber, elastomeric compounds, or any combination thereof. In one aspect of an embodiment of the present invention, it should be appreciated that the material selected for the surface 11 is preferably rigid or semi-rigid. Rigid materials are those which do not appreciably deflect during their normal use in function. Said differently, a rigid material is one where the flexure of the material does not add to or enhance the function of the device 1, but rather is only a side effect of its use. A semi-rigid material is one that does intentionally flex during use for the enhancement of function, in this case the recreation of a realistic tactile sensation of inserting a tracheotomy tube through a patient tracheostomy, but that the material does not permanently deform during normal use or have a lasting change in its dimensions or properties.

Still referring to FIG. 1 and FIG. 2, it should also be appreciated that the illustrations shown are not to scale, and are not to be construed as limiting the device 1 to any particular geometry. Notably, in an aspect of an embodiment of the present invention, the diaphragm 21 may take on a number of different geometries, shapes, or locations. For instance, the diaphragm 21 may be located on the inner side 12 or outer side 13 of the surface 11. The diaphragm 21 may be mounted or attached to the surface 11 in any number of ways, including, but not limited to, the use of fasteners, adhesives, or to be molded directly onto the surface 11. Furthermore, multiple diaphragms may be used on either the inner side 12 or outer side 13 of the surface 11, or both the inner side 12 and outer side 13 simultaneously. It should also be appreciated that the diaphragm 21 may take on a number of geometries, including that of a grommet. The diaphragm 21 may also have multiple threshold surfaces sized as $D_D$, or may pass through and wrap around the surface aperture 42.

Figure 3:
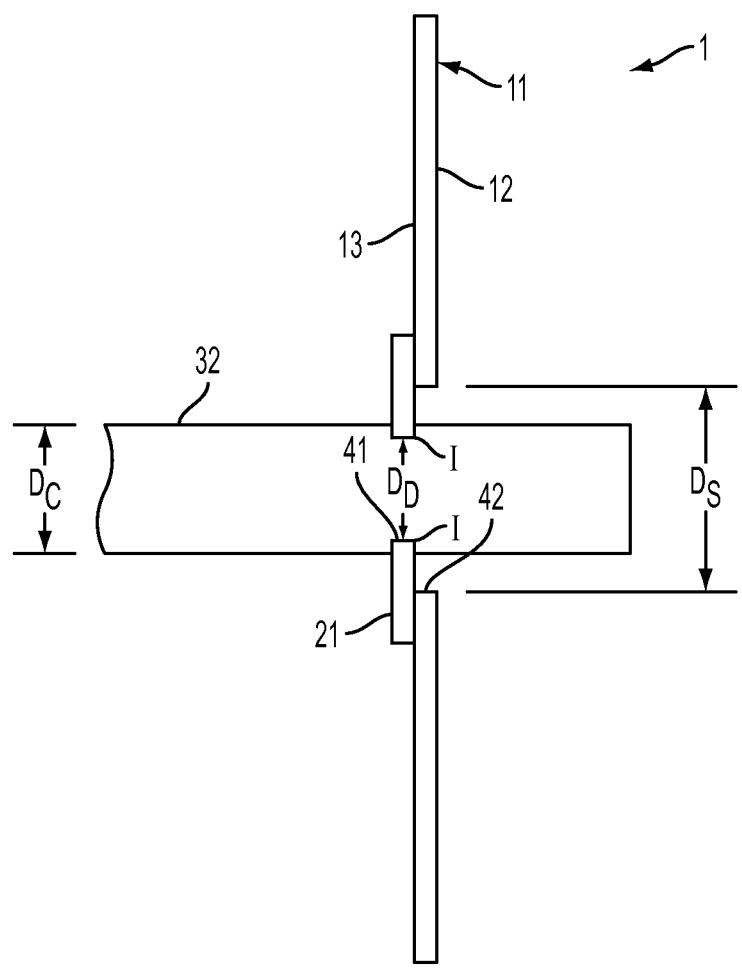
FIG. 3 provides a side view schematic illustration of an embodiment of the tracheostomy trainer device with a tracheotomy tube inserted in the diaphragm.

FIG. 3 provides a schematic sectional view of the device 1 being penetrated by the outer cannula 32 of a tracheotomy tube. Once again, the surface 11 is shown with an inner side 12 and outer side 13. The surface 11 is shown with a surface aperture 42, sized at a diameter $D_S$. The surface aperture 42 and the surface 11 are in communication with a diaphragm 21 having a diaphragm aperture 41 sized at diameter $D_D$. FIG. 3 further shows that the diaphragm 21 is penetrated through the diaphragm aperture 41 by the outer cannula 32 of a tracheotomy tube. The outer cannula 32 has an outer diameter of $D_C$. It should be appreciated that the diameter $D_C$ of the outer cannula 32 is greater in size than the diaphragm aperture 41 and smaller than the surface aperture 42. This difference in size creates an interference I which is defined by the difference between the diameter $D_C$ of the outer cannula 32 and the diameter $D_D$ of the diaphragm aperture 41.

It should be appreciated that a user may alter, modify, or specify the tactile sensation received by the user, the force necessary to penetrate the diaphragm with the cannula of a tracheotomy tube, and the change in force from the initial application of the tracheotomy tube cannula, through penetration, and then further movement of the tube through the diaphragm. A number of parameters may be adjusted, set, or modified in order to create the desired feel, and to customize the device to different tracheotomy tubes having different sizes of cannula or different penetrative properties. For example, the choice of materials, both for the diaphragm and the surface, may be chosen based on their relative stiffness, pliability, and frictional properties. It should also be appreciated that the mechanical and dynamic properties of the device may be altered by varying the relative sizes of the surface aperture and the diaphragm aperture. Different tactile sensations for the user may be achieved, for example, by having a larger or smaller delta between the surface aperture and the diaphragm aperture. Similarly, different amounts of interference between the diaphragm and the outer cannula of a tracheotomy tube will create different sensations and tactile responses for the user. The diaphragm may also take on a number of different geometries, including different methods of attachment, different thicknesses, and a larger number of interference thresholds that allow a user to tailor a particular feel for different sizes and materials of tracheotomy tubes, or to customize the device to recreate the tactile sensations of differences in anatomy that may be due to age, sex, or the relative size of a patient.

Figure 4:
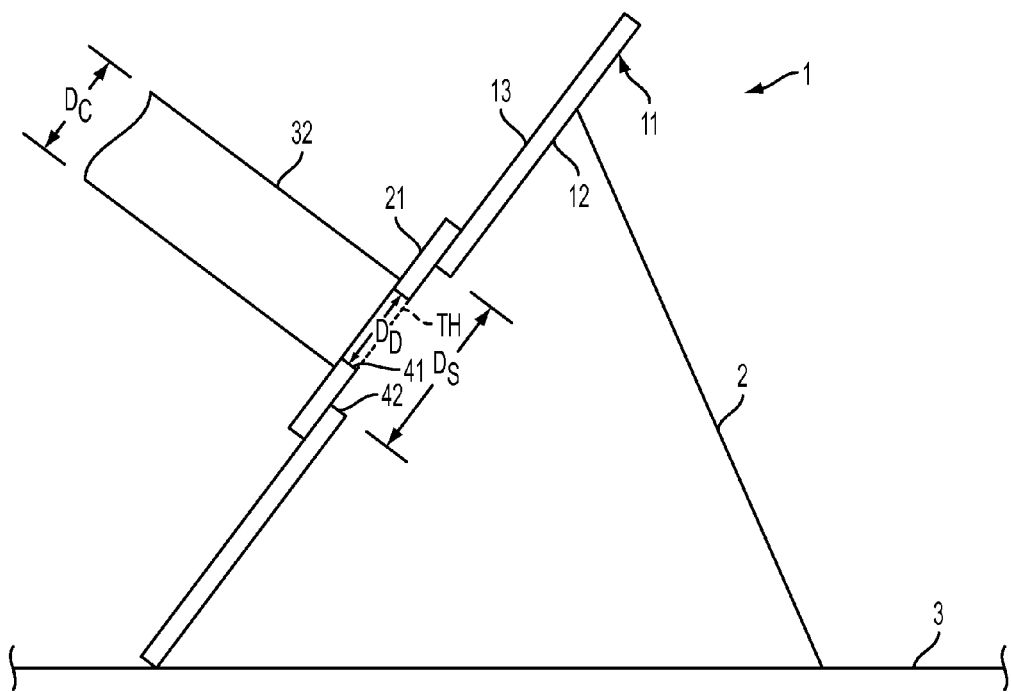
FIG. 4 provides a side view schematic illustration of an embodiment of the tracheostomy trainer device with an included stand.

FIG. 4 provides a schematic sectional side view of an aspect of an embodiment of the device 1 in communication with the ground or a base 3 and a stand 2. In this view, the surface 11 can be seen to have an inner side 12 and an outer side 13. The surface 11 has a surface aperture 42 with diameter $D_S$. The surface 11 is in communication with a diaphragm 21, which has a diaphragm aperture 41 of diameter $D_D$. As shown, the outer cannula 32 of a tracheotomy tube having a diameter $D_C$ is poised at the threshold TH of the diaphragm aperture 41. In an aspect of an embodiment of the device 1, the device may be in communication with a stand 2 or similar means for propping or holding the device up above the ground or a base 3. It should be appreciated that the device 1 may itself include the base 3, or that the base 3 may consist of the ground, a table, or other suitable surface that the device 1 may be used on in conjunction with the stand 2.

Figure 5:
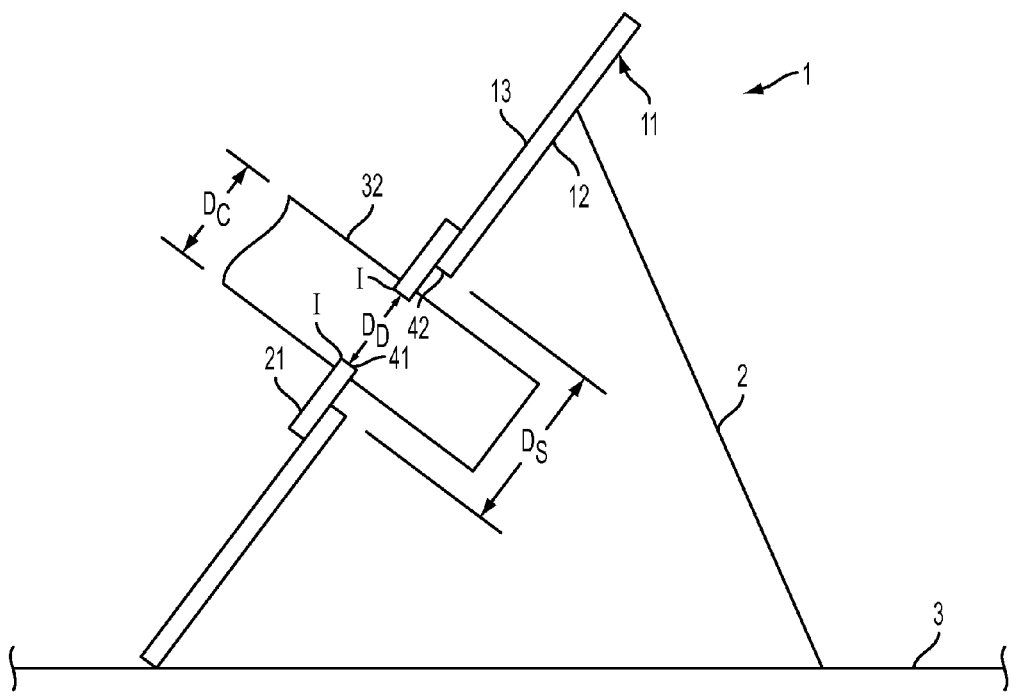
FIG. 5 provides a side view schematic illustration of an embodiment of the tracheostomy trainer device with an included stand and a tracheotomy tube inserted in the diaphragm.

FIG. 5 provides a schematic sectional side view of an aspect of an embodiment of the device 1 in communication with the ground or a base 3 and a stand 2. In this view, the surface 11 can be seen to have an inner side 12 and an outer side 13. The surface 11 has a surface aperture 42 with diameter $D_S$. The surface 11 is in communication with a diaphragm 21, which has a diaphragm aperture 41 of diameter $D_D$. As shown, the outer cannula 32 of a tracheotomy tube having a diameter $D_C$ has penetrated the threshold of the diaphragm aperture 41 creating an interference I between the outer cannula 32 and the diaphragm 21 which recreates the tactile sensation of a user pressing a tracheotomy tube through the tracheostomy of a patient. In an aspect of an embodiment of the device 1, the device may be in communication with a stand 2 or similar means for propping or holding the device up above the ground or a base 3. It should be appreciated that the device 1 may itself include the base 3, or that the base 3 may consist of the ground, a table, or other suitable surface that the device 1 may be used on in conjunction with the stand 2.

Figure 6:
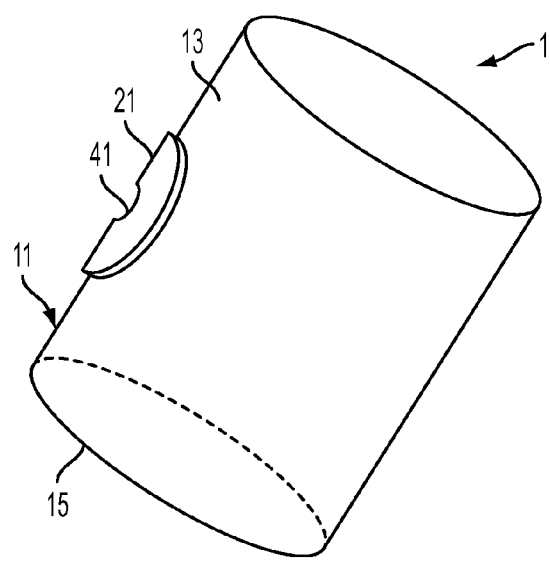
FIG. 6 provides a schematic perspective view of a cylindrical embodiment of the tracheostomy trainer device.

FIG. 6 provides a schematic perspective view of an aspect of an embodiment of the present invention. The device 1 has a surface 11 with an outer side 13. The surface 11 is in communication with a diaphragm 21 having a diaphragm aperture 41. The surface 11 has been configured into a cylindrical shape having a bottom 15. It should be appreciated that the surface 11 may be configured into a hollow cylinder preserving a space inside the surface 11 that may be used for storage or other purposes.

Figure 7:
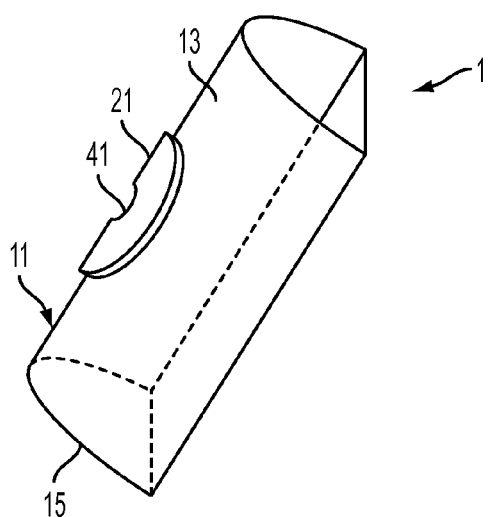
FIG. 7 provides a schematic perspective view of a semi-cylindrical embodiment of the tracheostomy trainer device.

FIG. 7 provides a schematic view of an aspect of an embodiment of the present invention. The device 1 has a surface 11 with an outer side 13. The surface 11 is in communication with a diaphragm 21 having a diaphragm aperture 41. The surface 11 has been configured into a semi-cylindrical shape having a bottom 15.

It should be appreciated that the surface of the device may be configured into a number of different shapes to provide various functional properties other than serving as the support for the diaphragm. For instance, the surface may be relatively planar to allow for easy stacking, storage, or shipping. The surface may also be configured into any three dimensional shape, such as a cylinder, semi cylinder, or any other shape (or housing) that is desired or required. In an aspect of an embodiment of the present invention, the surface may be shaped so as to be open, for example, having one or more openings at any location on the device allowing for access to the inner portions. In another aspect of an embodiment of the present invention, the surface may be configured to have openings which can be selectively closed or opened by lids, which may be hinged, attached via tether, or completely detachable. As such, the surface may be configured to have an interior space that may provide storage for replacement parts or other items which may be included with the device, such as in a kit.

It should also be appreciated that the device may be provided with a flat panel disposed across from the surface aperture and diaphragm. This flat portion of the surface would allow the device to be placed on a table, floor, bed, or other work area and provide stability for the user during training. The flat portion of the surface would also provide additional functionality by providing an ideal location for instructional materials. The instructions may be included as, but not limited to, a relief sculpture of the relevant anatomy, optionally with molded in or applied color for differentiation of particular areas, or an area for printing, coloring, or the location of a decal for instructional and educational materials for the user.

Figure 8:
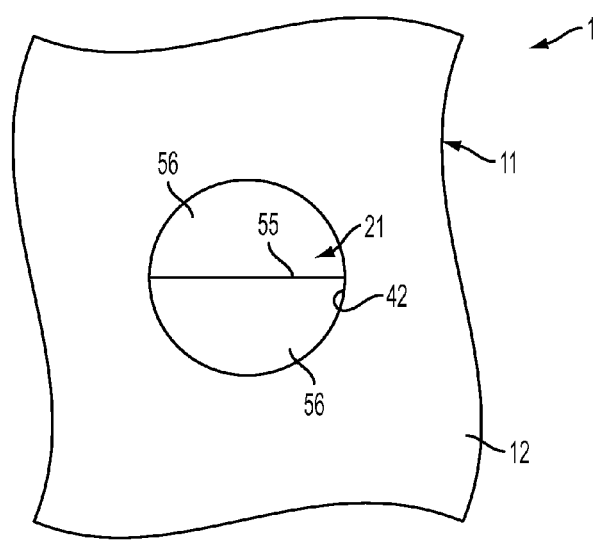
FIG. 8 provides a back view schematic illustration of an embodiment of the tracheostomy trainer device incorporating a slit valve diaphragm.

FIG. 8 provides a back view schematic illustration of an aspect of an embodiment of the present invention. The device 1 has a surface 11 having an inner side 12 and an outer side (not shown). The surface 11 is in communication with a diaphragm 21. In this representation, the diaphragm 21 is in communication with the outer side of the surface 11 and the view is taken from the direction of the inner side 12. The diaphragm 21 is disposed over the surface aperture 42. In an aspect of an embodiment of the present invention, the diaphragm 21 has a slit valve covering the surface aperture 42. The slit valve may be comprised of, but is not limited to, one or more panels 56 containing or defining one or more slits 55. The slit valve may dilate on application of a tracheotomy tube to provide the initial resistance to penetration and to provide the user with the resultant tactile sensation of penetrating the tracheostomy of an actual patient.

Figure 9:
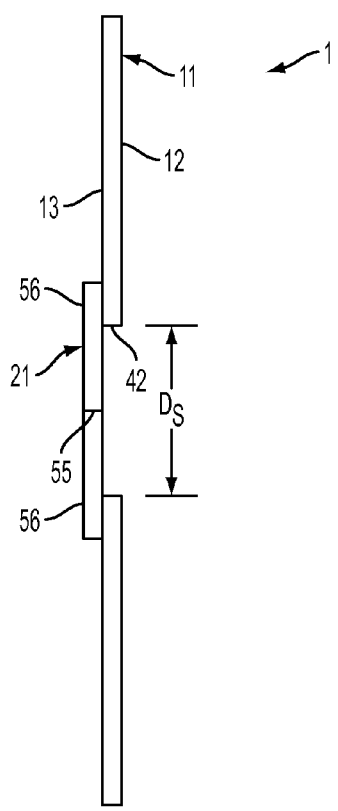
FIG. 9 provides a side view schematic illustration of an embodiment of the tracheostomy trainer device incorporating a slit valve diaphragm.

FIG. 9 provides a side view schematic sectional illustration of an aspect of an embodiment of the present invention. The device 1 has a surface 11 with an inner side 12 and an outer side 13. The surface 11 has a surface aperture 42 with a diameter of $D_S$ that is in communication with a diaphragm 21. The diaphragm 21 provides a slit valve comprised of, but not limited to, one or more panels 56 containing or defining one or more slits 55. In this particular representation of an aspect of an embodiment of the present invention, the slit valve contains two panels 56 and one slit 55 that allows for dilation and the passage of a tracheotomy tube through the diaphragm 21.

Figure 10:
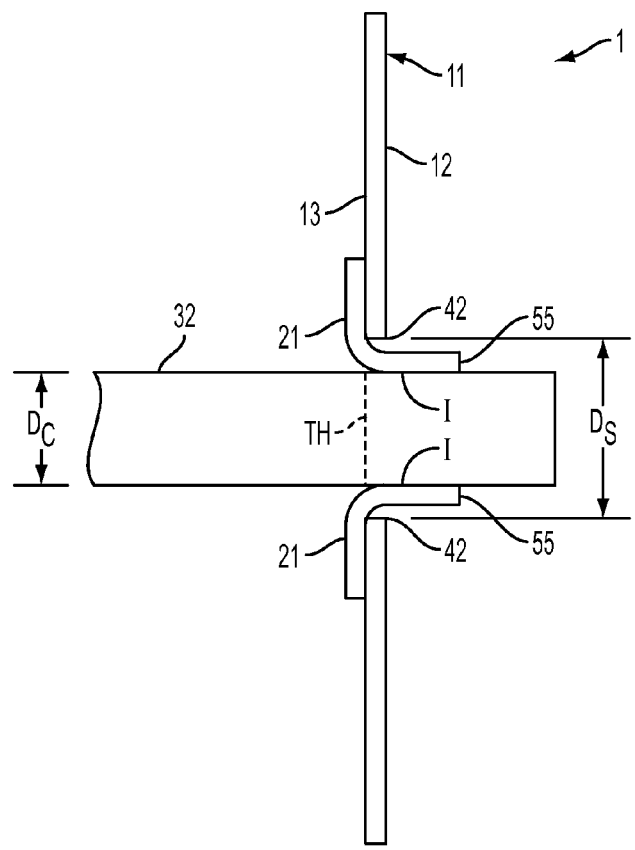
FIG. 10 provides a side view schematic illustration of an embodiment of the tracheostomy trainer device incorporating a slit valve diaphragm with a tracheotomy tube inserted in the slit valve diaphragm.

FIG. 10 provides a side view schematic sectional illustration of an aspect of an embodiment of the present invention. The device 1 has a surface 11 with an inner side 12 and an outer side 13. The surface 11 has a surface aperture 42 and is in communication with a diaphragm 21. The diaphragm 21 provides a slit valve comprised of, but not limited to, two panels 56. The panels 56 are flexed and disposed towards the inner side 12 of the surface 11 due to the penetration of the outer cannula 32 past the threshold TH. The penetration of the tracheotomy tube has caused a region of interference I. It should be appreciated that the diameter $D_C$ of the outer cannula 32 is less than the diameter $D_S$ of the surface aperture 42.

Figure 11:
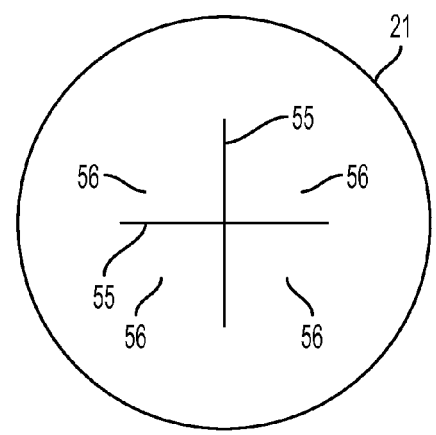
FIG. 11 provides a schematic illustration of an embodiment of a slit valve diaphragm.

FIG. 11 provides a schematic illustration of an aspect of an embodiment of the present invention. Here, the diaphragm 21 is shown as a slit valve comprised of panels 56 which are defined by slits 55. In this representation, the slit valve has four panels 55 which are defined by four slits 55. However, it should be appreciated that the number and shape of panels 56 and slits 55 may be modified as desired or required to provide the functionality required by any particular aspect of an embodiment of the present invention.

It should be appreciated that the diaphragm in the form of a slit valve may be modified in a number of ways, including but not limited to the same ways that an aperture diaphragm may be modified, in order to provide the desired tactile sensations to the user. For instance, the slit valve may be composed of a number of different materials to provide different qualities of flexibility, pliability, or friction. The geometry of the slit valve may also be modified in order to provide different values of resistance and different qualities of change in resistance as the slit valve is penetrated by the tracheotomy tube. For instance, the slit valve diaphragm may be located on the inside or outside of the surface of the device, or both. The slit valve may also be comprised of one piece of material that has been cut to provide a number of slits and panels, or it may be comprised of multiple different pieces of material, the boundaries of which define the slits that allow for dilation and penetration. Other aspects of the slit valve may also be altered to provide different tactile sensations to the user. For instance, the thickness of the material, slit size, both in length and width of the slits, and the individual panels may placed so as to provide slits which consist of overlapping portions of panels. The device may also be altered by having multiple slit valves to provide multiple levels of penetration, and that the ratio of the surface opening to the outer cannula size of the tracheotomy tube may be used to adjust the mechanical and dynamic properties of the device.

It should also be appreciated that any of the listed potential modifications to the aperture diaphragm may be applied to the slit valve diaphragm, and vice versa, unless such modifications would be non-functional. It should also be appreciated that other modifications not listed would be possible to either style of diaphragm in order to produce the desired results.

It should be appreciated that a number of different geometries or device configurations may be used to provide a realistic feel or tactile sensation to the user. For instance, an alternative method of mounting the diaphragm to the surface may be used. As an example of an aspect of an embodiment of the present invention, the diaphragm may be molded or formed directly onto the surface aperture. As opposed to mounting the diaphragm either to the inner side or outer side of the surface, the diaphragm may be attached or molded directly onto the inner boundary of the surface aperture, providing a smooth appearance to the user. The transition from surface material to diaphragm material may or may not include a seam in this case. All of the methods for adjusting the feel or sensation to the user for a diaphragm would be available for these embodiments.

Another example of an aspect of an embodiment of the present invention would be for the surface itself to provide a realistic tactile sensation or feel to the user. In this case, the surface itself would be molded, cut, modified, or otherwise formed to provide this functionality. For example, the surface itself may be directly formed with a slit valve (or any other access means or mechanism as provided throughout this disclosure) where the surface aperture would otherwise be located. The surface aperture itself may me formed in such a way as to provide dilation upon insertion of a penetrating instrument by having a surface aperture diameter that is smaller than the diameter of the penetrating instrument. The surface may also be formed so as to have an integrated flap, panel or door that the user may force a penetrating instrument past so as to provide realistic feel or tactile sensation that recreates the insertion of a penetrating instrument into a subject stoma. In the case of the surface itself providing realistic feel to the user, the resulting tactile sensation may be adjusted as desired or required through the following parameters: material choice, aperture size, type of aperture obstruction, if any, aperture size, amount of interference between the aperture and the tracheotomy tube or penetrating instrument, threshold geometry (i.e. rounded, square, napier profile, tapered, etc.), thickness of surface material, and changes to the thickness of the surface material at or near the penetration site (e.g. thinning, thickening, or variations thereof). The previous list of parameters is not an exhaustive list, and other opportunities for modification of feel are possible. Moreover, any combinations of such parameters may be implemented.

Yet another example of an aspect of an embodiment of the present invention may allow for the diaphragm to be replaced with a mechanical resistance device that would provide realistic tactile sensations to the user. For instance, the surface aperture may be obscured or covered by a small flap, panel or door that is mechanically linked to the surface.

A hinge, spring, flexible tether, or other means may provide a mounting that allows for high initial resistance followed by a fast transition to lower resistance to penetration past a certain displacement or application of force. The means for attachment of the flap, panel or door should provide the proper resistance profile and should assist in locating the moveable flap, panel, or door at the site of the surface aperture. It should be appreciated that multiple panels, flaps, or doors may be used at a surface aperture, and these multiple panels, flaps, or doors may share or have separate linking means. It should also be appreciated that the feel for the user may be adjusted or modified as desired or required by altering the parameters of the specific linking means that is used in that specific embodiment of the present invention. Furthermore, the tactile sensation experienced by the user may be adjusted through adjusting the geometry, size, material, thickness, or relative amount of covering that the flap, panel or door provides; or any combination thereof. That is, the flaps, panels or doors may cover the entire surface aperture, or it may only cover a portion of the surface aperture leaving a portion of the surface aperture exposed.

Figure 12:
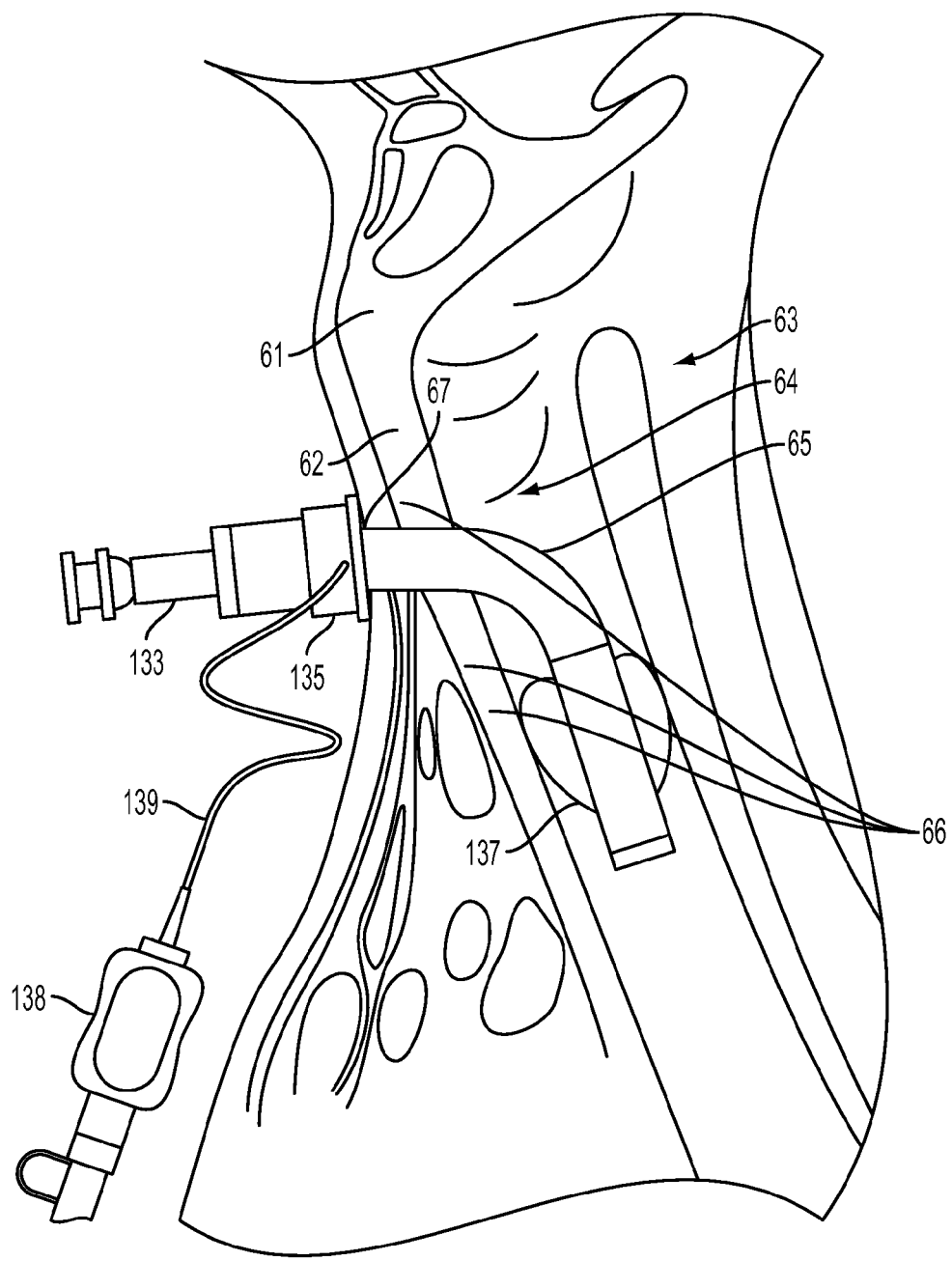
FIG. 12 provides a schematic illustration of a tracheotomy tube inserted through a stoma into a human patient's airway.

FIG. 12 provides a schematic illustration of a tracheotomy tube 65 inserted through a tracheostomy 67 (e.g., stoma) into the trachea 64. Various parts of anatomy are displayed for illustrative purposes, including the thyroid cartilage 61, cricoid cartilage 62, esophagus 63, and tracheal cartilage 66. Also for illustrative purposes, the tracheotomy tube 65 components are shown, including the inner cannula 133, retainer 135, inflatable cuff 137, pilot balloon 138, and cuff inflation line 139.

Figure 13:
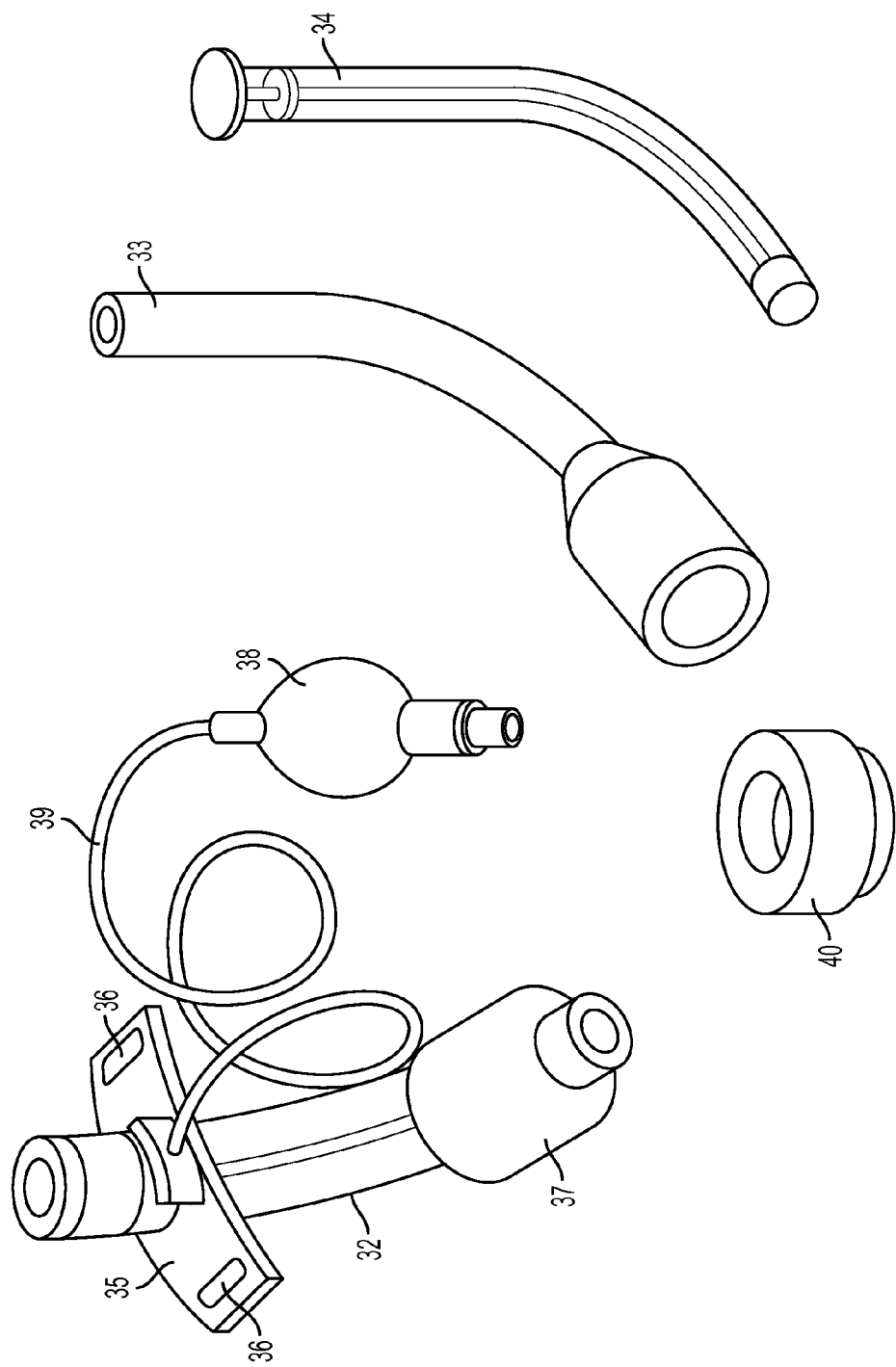
FIG. 13 provides a schematic illustration of the components of a tracheotomy tube device.

FIG. 13 provides a schematic illustration of a tracheotomy tube device with several parts disassembled for illustrative purposes. A tracheotomy tube device may be comprised of parts such as an outer cannula 32, inner cannula 33, obturator 34, retainer for outer cannula 35, retainer eyelets 36, an inflatable cuff 37, a pilot balloon 38, a cuff inflation line 39, and a trachea plug 40. It should be appreciated that the shown tracheotomy tube is for illustration purposes only. Actual tracheotomy tubes that may be used with the tracheostomy training device may vary in their shape, size, or number and type of included parts.

Figure 14:
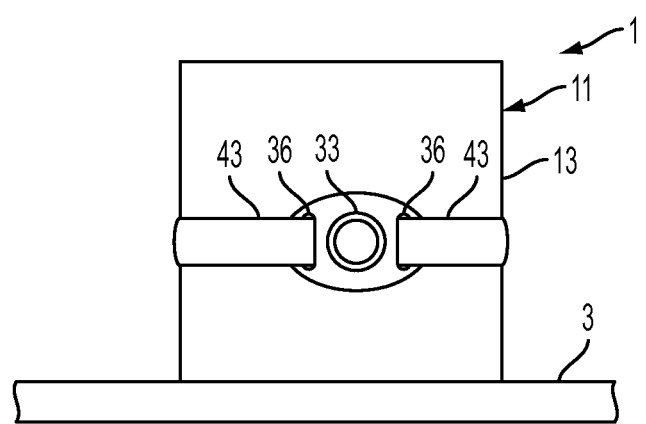
FIG. 14 provides a front view schematic illustration of an embodiment of the tracheostomy trainer device with a tracheotomy tube inserted in the diaphragm.

FIG. 14 provides a front view schematic illustration of an aspect of an embodiment of the present invention wherein the device 1 has a tracheotomy tube mounted to it. The device 1 is shown with a surface 11 having an inner side (not shown) and an outer side 13. The device 1 is position on a base or surface 3 which may or may not be an integral part of the device 1. A strap 43 is mounted around the outer side 13 of the surface 11 of the device 1, and is in communication with the eyelets 36 of the tracheotomy tube. The inner cannula 33 is visible in this representation of the present invention. FIG. 14 illustrates how the tracheotomy tube may be mounted onto the device 1 during use.

Figure 15:
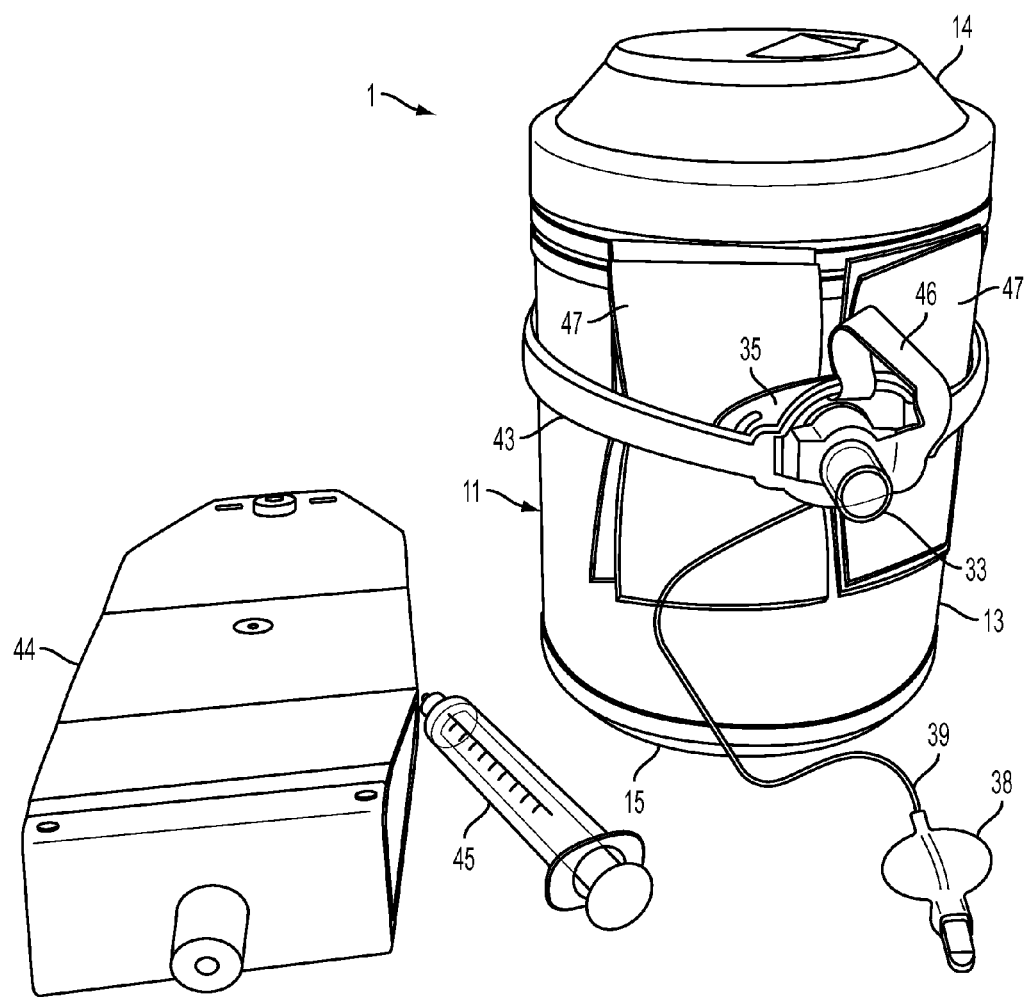
FIG. 15 provides a schematic perspective view of an embodiment of the tracheostomy device with other pieces, which may be included in a kit or provided as necessary.

FIG. 15 provides a schematic illustration of an aspect of an embodiment of the device 1 provided to the end user as part of a kit for training a user in various aspects of tracheostomy care and maintenance. As illustrated, the device 1 has a surface 11 with an outer side 13 and a bottom 15. In this depiction of the device 1 the bottom 15 is integrated into the surface 11, though it should be appreciated that the bottom 15 may also be a replaceable or removable part. The device 1 also comes equipped with a lid 14 to allow for selective access to the interior of the device, and to allow for the device 1 to enclose or contain other parts of the kit. It should be appreciated that the kit may be delivered with the device 1, or the kit may be assembled on site from the device 1 and equipment or components that are available in a hospital, doctor's office, the home of the patient, or purchased from a medical supply company. In an aspect of an embodiment of the present invention, the device 1 is delivered with mechanical test lungs 44, a syringe 45, a ventilation strap 46, a drain sponge 47, a strap 43, an inner cannula 33, a retainer 35, a pilot balloon 38, and a cuff inflation line 39.

Figure 16:
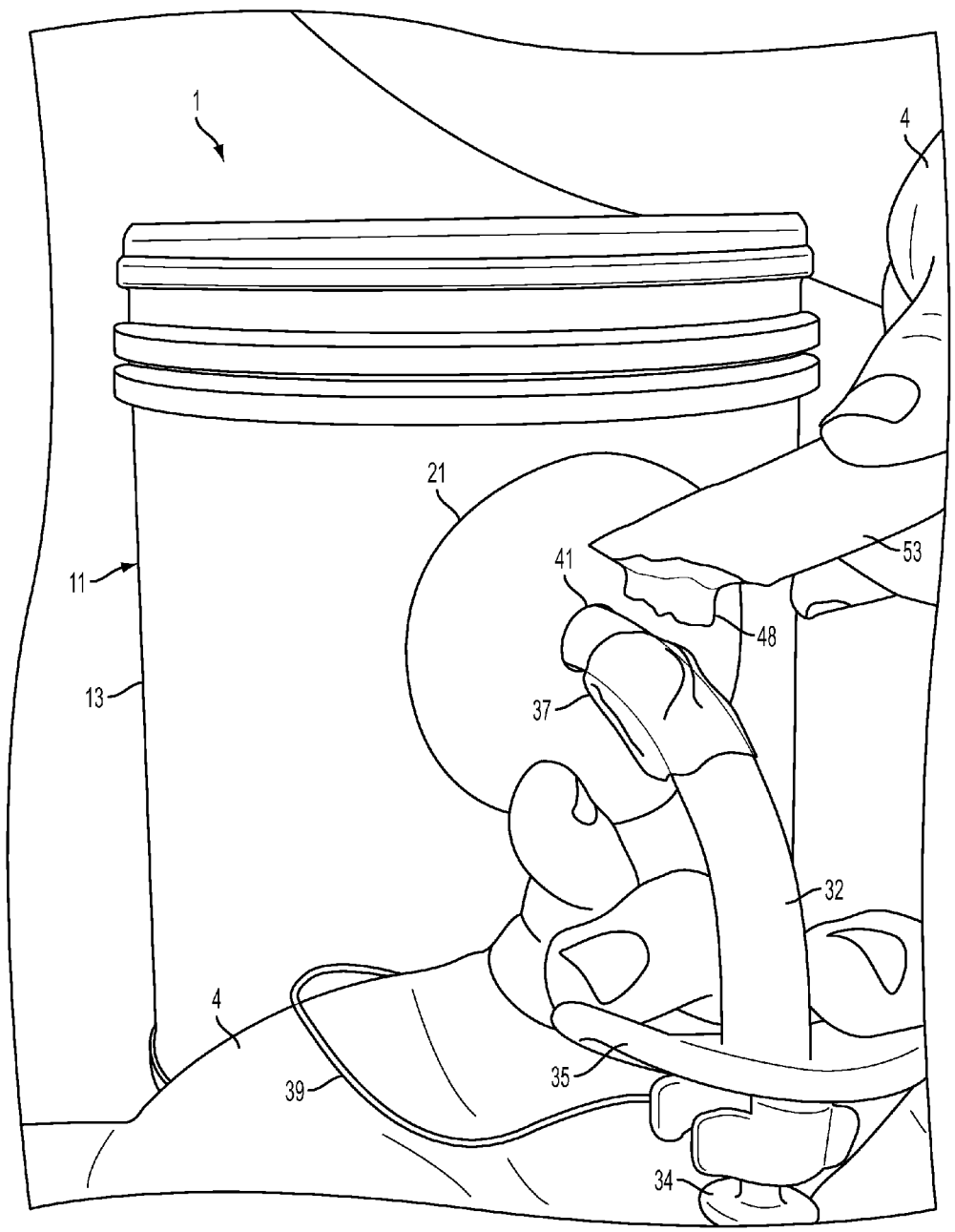
FIG. 16 provides a schematic perspective view of an embodiment of the tracheostomy trainer device in use by an operator to insert the tracheotomy tube.

FIG. 16 provides a schematic illustration of an aspect of an embodiment of the present invention as used to simulate the insertion or cannulation of a tracheotomy tube. The device 1 is shown with a surface 11 that has an inner side (not shown) and an outer side 13. A diaphragm 21 is in communication with the surface 1 1and has a diaphragm aperture 41. In FIG. 16, a user 4 can be seen using the device 1 to simulate the insertion of a tracheotomy tube. As illustrated, the tracheotomy tube consists of an outer cannula 32 with a user inflatable cuff 37. The outer cannula 32 is also in communication with a retainer 35 and an obturator 34. A cuff inflation line 39 is also visible, and allows the user to inflate the cuff 37. In this representation of an aspect of an embodiment of the present invention, the user 4 is performing insertion or cannulation of the outer cannula 32 into the diaphragm aperture 41, and is simultaneously applying a lubricant 48 from a lubricant package 53. It should be appreciated that FIG. 16 is for illustrative purposes only, and should not be construed as to limit the invention to this particular representation. The device 1 may take on many more forms, and it may be used with a number of different styles, shapes, or sizes of tracheotomy tube. Also, additional parts or features may be present, and some features, for example the lubricant 48, may not be necessary for all simulation purposes.

One feature of an aspect of an embodiment of the present invention is to provide a device that allows for the training of a user in the insertion or cannulation of a tracheotomy tube into the tracheostomy (or stoma) of a patient. In particular, the device is intended to offer a realistic tactile experience to the user. That is, the user should feel an initial high resistance, followed by a fast transition to a lower resistance as the tracheotomy tube passes through the diaphragm into the device. A user may describe this feeling as a "pop". The intention of the device is to acclimate and educate a user on the proper insertion procedures, and what a user should expect to feel during the procedure. This realistic tactile sensation may or may not be accompanied by a realistic appearance of the device. It should be appreciated that an embodiment of the device may be applicable to any type of stoma of various anatomies.

It should be appreciated that an embodiment of the present invention may include a surface or related components that are opaque, transparent, or translucent (or any combination thereof). Moreover, for a opaque surface (device material) then the user may need to rely on tactile sensations rather than visual sensation.

Figure 17:
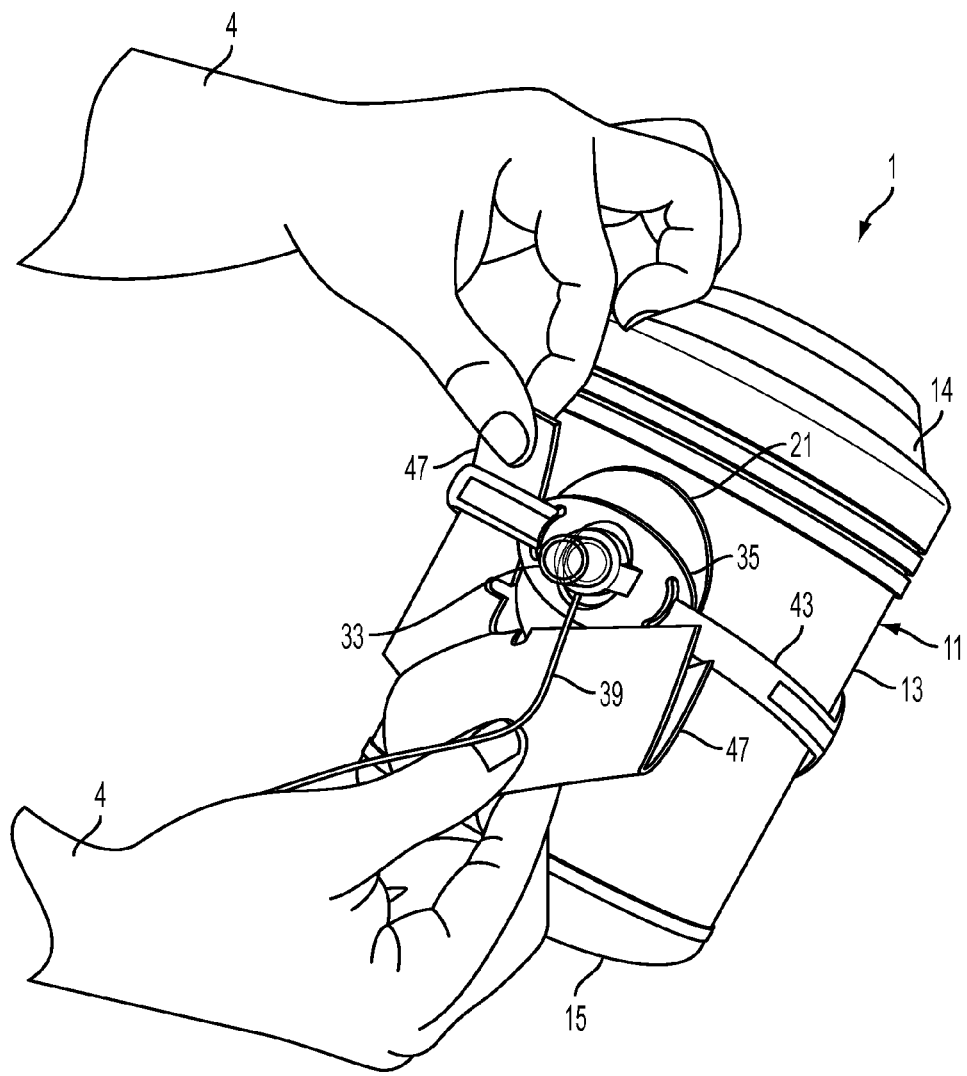
FIG. 17 provides a schematic perspective view of an embodiment of the tracheostomy trainer device in use by an operator to demonstrate care and cleaning of a tracheostomy.

FIG. 17 provides a schematic illustration of an aspect of an embodiment of the present invention where the device 1 is used to demonstrate to a user 4 the care and cleaning of the tracheostomy opening, here represented by the diaphragm aperture (not visible). The device 1 has a surface 11 with an outer side 13. In this particular representation, the device 1 is shown with a bottom 15 and a removable and replaceable lid 14. It should be appreciated that the bottom 15 and lid 14 are not essential to the operation of the device, and may be included or omitted as desired or required. The surface 11 is in communication with a diaphragm 21 which already has a tracheotomy tube inserted through it. The outer portions of the tracheotomy tube may be seen in FIG. 17 as represented by the portions that are visible to the user as represented by the inner cannula 33, retainer 35, and cuff inflation line 39. The user 4 then has access to the portions that they would normally see during use with an actual patient. The tracheotomy tube is held onto the device 1 by a strap 43, as is commonly used with an actual patient. The user 4 may then practice the care and cleaning of the patient tracheostomy. For example, in FIG. 17, the user 4 is replacing a drain sponge 47 that is used to maintain a clean and dry area around the tracheotomy tube. It should be appreciated that this is only one illustrated example of care, cleaning, and maintenance that may be simulated by the device 1, and that others are also possible.

Figure 18:
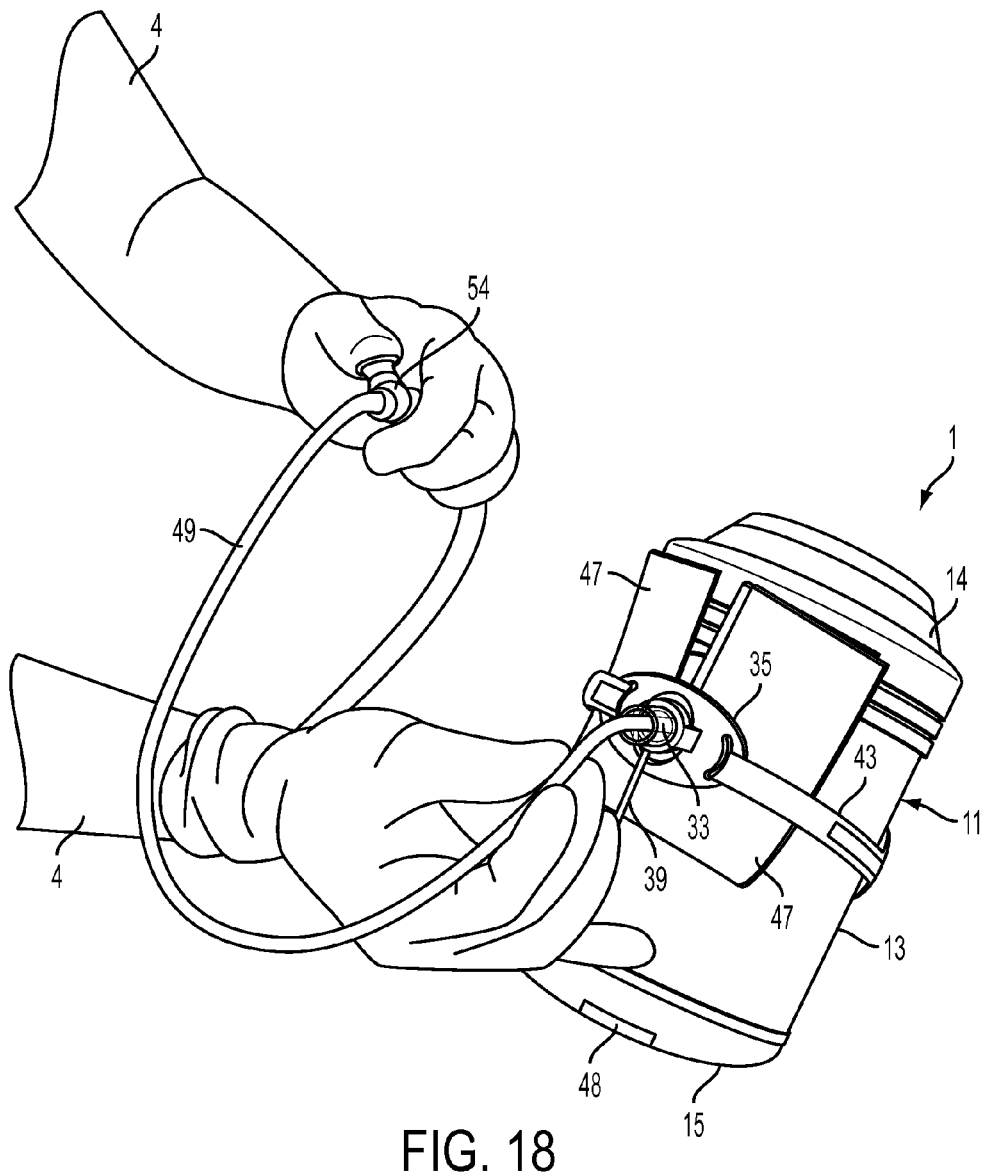
FIG. 18 provides a schematic perspective view of an embodiment of the tracheostomy trainer device in use by an operator to demonstrate suctioning of the tracheotomy tube and patient airway.

FIG. 18 provides a schematic illustration of an aspect of an embodiment of the present invention wherein a user 4 is simulating the suctioning of the tracheotomy tube and trachea of a patient. The device 1 is shown with a surface 11 having an outer side 13, a bottom 15, and a removable lid 14. The device 1 is also shown having a device plug 48, which may consist of a grommet, plug, seal, or other means for sealing up a small opening in the bottom 15 of the device. It should be appreciated that it is not required for the device 1 to have a device plug 48, and that the device plug 48 may be located anywhere on the device as desired or required for additional functionality. Furthermore, the device may be provided with multiple device plugs as needed. The device 1 is shown with a tracheotomy tube inserted through the diaphragm aperture (not shown). The tracheotomy tube is represented by the parts which are visible, including the inner cannula 33, retainer 35, and cuff inflation line 39. The tracheotomy tube is held to the device 1 by a strap 43 which is attached to the retainer 35. A drain sponge 47 is also shown for illustrative purposes. The user 4 is simulating the procedure of providing suction to the tracheotomy tube and trachea to remove any fluids or obstructions that may be present. In this representation, the user 4 is performing suction by inserting suctioning tubing 49 into the inner cannula 33. The suctioning tubing is further connected to a tubing adapter 54, which allows the suctioning tubing 49 to be attached to a larger or smaller size of tubing that may be attached to a suction source (not shown). It should be appreciated that the plug may be a variety of sizes including occupying an entire side of the container or housing of the device, or it may be a portion of the side of a container or housing, for example.

Figure 19:
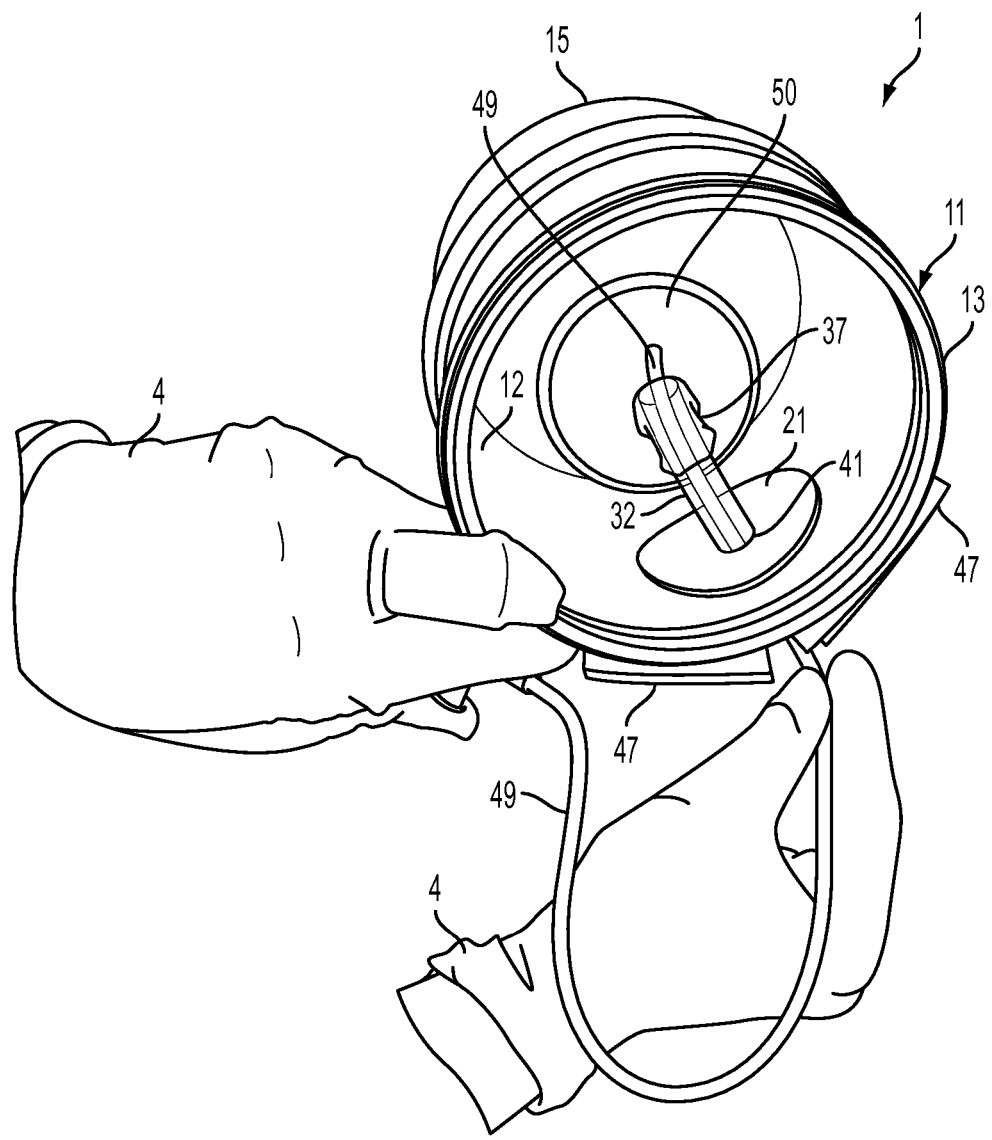
FIG. 19 provides an interior schematic perspective view of an embodiment of the tracheostomy trainer device in use by an operator to demonstrate suctioning of the tracheostomy tube and patient airway.

FIG. 19 provides a schematic illustration of an alternate view of an aspect of an embodiment of the present invention during the simulation of a suction procedure. In this view, the interior of device 1 can be seen during the suction simulation. The device 1 has a surface 11 having an inner side 12 and an outer side 13. The device 1 also has a bottom 15. The inner side 12 of the surface 11 is in communication with a diaphragm 21 having a diaphragm aperture 41. The outer cannula 32 of a tracheotomy tube can be seen passing through the diaphragm aperture 42. The outer cannula 32 is in communication with a cuff 37 that may be inflated by the user. A drain sponge 47 is also shown for illustrative purposes. In this depiction of an aspect of an embodiment of the present invention, the user 4 is passing suctioning tubing 49 from the outside of the device 1, through the tracheotomy tube to the inside of the device 1. The end of the suctioning tubing 49 can be seen extending from the end of the outer cannula 32 and inflatable cuff 37. The end of the suctioning tubing 49 is shown extending from the outer cannula 32 into simulated sputum 50. It should be appreciated that the simulated sputum 50 may consist of any liquid or material that would be beneficial in training the user 4 on proper suctioning techniques.

It should also be appreciated that simulation of suctioning techniques may include other apparatus than shown in FIG. 19. The device may be modified or used as necessary to accommodate a wide variety of suctioning devices or methods. Also, it should be appreciated that the particular embodiment illustrated is not the only embodiment of the device that may be used for the simulation of suction procedures.

Figure 20:
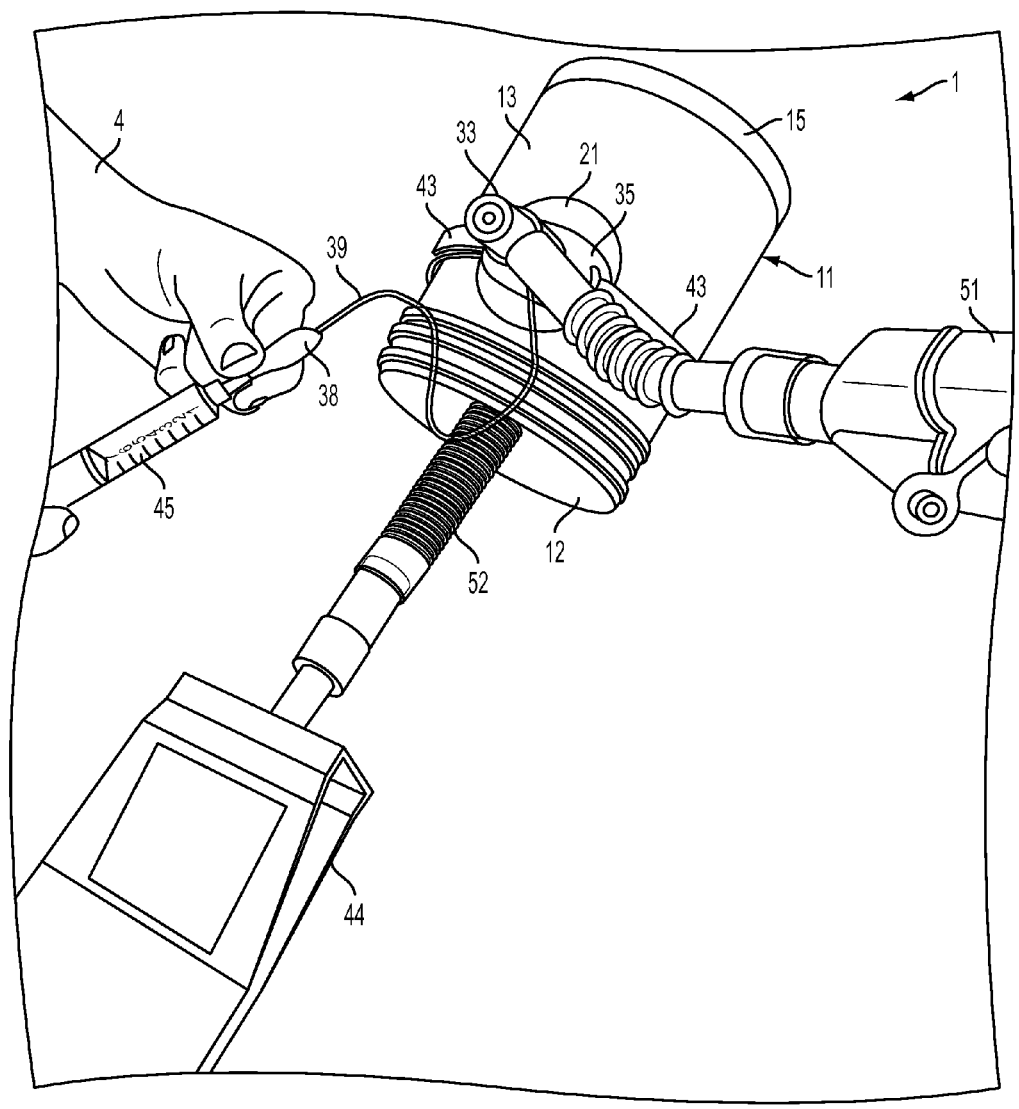
FIG. 20 provides a schematic perspective view of an embodiment of the tracheostomy trainer device in use by an operator to demonstrate ventilation of a patient through the tracheotomy tube.

FIG. 20 provides a schematic illustration of an aspect of an embodiment of the present invention being used to simulate ventilation and proper tracheotomy tube cuff inflation. The device 1 is shown having a surface 11 with an outer side 13 and an inner side 12. The device 1 is shown in an inverted position with the bottom 15 located at the top of FIG. 20. The surface 11 is in communication with a diaphragm 21 that has a diaphragm aperture (not shown). A tracheotomy tube is positioned through the diaphragm aperture, and the visible portions of the tracheotomy tube, including the inner cannula 33 and the retainer 35 are visible in FIG. 20. The tracheotomy tube is held to the device 1 by a strap 43 which is in communication with the retainer 35. In this depiction of an aspect of an embodiment of the present invention, the device 1 has been configured with other equipment, which may or may not be included with the device 1 as a kit, in order to simulate ventilation and tracheotomy tube cuff inflation. In this illustration, the user 4 is inflating the cuff (not visible) by attaching a syringe 45 to the pilot balloon 38 and passing air through the cuff inflation line 39 to inflate the cuff (not visible). In an aspect of an embodiment of the present invention, the tracheotomy tube that is inserted through the diaphragm aperture has the portion of the outer cannula with the inflatable cuff inserted into a length of corrugated tubing 52. This allows the user 4 to practice inflation of the cuff using the syringe 45 or other means to achieve proper cuff inflation. The user 4 may also connect the length of corrugated tubing 52 to a mechanical test lung 44 and connect the tracheotomy tube to a ventilation device 51. The user 4 then may use the device 1 to simulate proper ventilation of a patient through a tracheotomy tube. A user 4 may use either a manual or mechanical ventilation device as is desired or required. It should be appreciated that a tube or conduit structure other than corrugated tubing may be used to simulate the feel of anatomy.

It should be appreciated that container may utilize an aperture vacated by a plug to provide access to or for any of the components or activities discussed herein.

It should be appreciated that the device may be provided alone, or in combination with the other equipment shown to provide a kit for the end user. The device may also be provided alone to a hospital or other care facility that may then add the necessary equipment to provide a kit to the end user. Also, it should be appreciated that the device may be used with a wide variety of equipment, and the equipment shown in the figures is for illustrative purposes only. The device may be compatible with a number of different medical devices, and it may be used in conjunction with any device that the user may need in addition to those shown in the figures and described above.

The device may also provide additional functionality based on the particular design and implementation of its features. For example, when the device is configured as a container, as illustrated in FIGS. 15-20, the device may be oriented in different ways to offer different functionality and training opportunities. Comparing FIG. 18 and FIG. 19 to FIG. 20, we can see that the device 1 may be inverted to change its functionality. In FIGS. 18 and 19, the bottom 15 of the device 1 is placed downwards, allowing it to serve as a reservoir or holding area for a fluid to be suctioned out by the user 4. However, when the device 1 is inverted as in FIG. 20, the bottom 15 is now located above the opening. This provides access to the interior of the device 1 to allow the user 4 to connect a length of corrugated tubing 52 to allow for simulation of tracheotomy tube cuff inflation and ventilation of a patient.

An alternative method for providing added functionality is the addition of the device plug 48 as shown in FIG. 18. Here, the device plug 48 allows the bottom 15 to hold liquid or simulated sputum 50 for suctioning, or to provide support for a vessel which holds the liquid or simulated sputum 50. Then, to simulate ventilation, the user 4 may clean out the liquid or simulated sputum 50 and remove the device plug 48 from the bottom 15. The user 4 then would have an opening through which to feed a length of corrugated tubing as seen in FIG. 20. The user 4 could then simulate ventilation with the device 1 without having to reorient it. This may be useful in cases where the user 4 wishes to mount the device 1 permanently or semi-permanently and still retain multiple training functionalities. For instance, the device 1 may be attached to a pillow or mattress using forceps to maintain stability and placement during use. It should be appreciated that other mechanism may be utilized to provide stability.

Various components of the device may be reusable and/or disposable after each use. For instance, It should be appreciated that as discussed herein, a subject may be a human or any animal. It should be appreciated that an animal may be a variety of any applicable type, including, but not limited thereto, mammal, veterinarian animal, livestock animal or pet type animal, etc. As an example, the animal may be a laboratory animal specifically selected to have certain characteristics similar to human (e.g. rat, dog, pig, monkey), etc. It should be appreciated that the subject may be any applicable human patient, for example. It should be appreciated that the dimensions provided for the device in the present disclosure are associated with humans. It should be appreciated that the scale of the dimension of the device may vary relative to the given species, animal type, or subject size. It should be appreciated that the scale of the dimension of the device may vary if utilized for other anatomical spaces or structures.

It should be appreciated that various sizes, dimensions, contours, rigidity, shapes, flexibility and materials of any of the components or portions of components in the various embodiments discussed throughout may be varied and utilized as desired or required. Similarly, locations and alignments of the various components may vary as desired or required.

It should be appreciated that any of the components or modules referred to with regards to any of the present invention embodiments discussed herein, may be integrally or separately formed with one another. Further, redundant functions or structures of the components or modules may be implemented.

It should be appreciated that the device and related components discussed herein may take on all shapes along the entire continual geometric spectrum of manipulation of x, y and z planes to provide and meet the anatomical, environmental, and structural demands and operational requirements. Moreover, locations and alignments of the various components may vary as desired or required.

EXAMPLES

Practice of an aspect of an embodiment (or embodiments) of the invention will be still more fully understood from the following example, which is presented herein for illustration only and should not be construed as limiting the invention in any way.

Example 1

A device for training an operator to care for a subject with a tracheostomy. The device may comprise: a rigid or semi-rigid surface; the surface containing at least one surface aperture; at least one diaphragm in communication with the rigid or semi-rigid surface; at least one diaphragm aperture in each of the at least one diaphragm; the at least one diaphragm aperture being smaller in size than the surface aperture; the at least one diaphragm aperture being configured for an interference fit with an outer portion of a tracheotomy tube or penetrating instrument; the interference fit configured to produce an initial resistance to insertion of the tracheotomy tube or penetrating instrument followed by lower resistance after the tracheotomy tube or penetrating instrument is displaced past a threshold of the at least one diaphragm aperture causing a sudden change in resistance; and the sudden change in resistance configured to provide the inexperienced operator with a tactile sensation similar to that of insertion of a tracheotomy tube into the tracheostomy of the subject.

Example 2

The device of example 1, wherein the rigid or semi-rigid surface comprises a housing. It should be appreciated that the housing may have any geometrical shape or configuration as desired or required.

Example 3

The device of example 2, wherein the housing is an open cylinder.

Example 4

The device of example 2, wherein the housing is an open semi-cylinder.

Example 5

The device of example 1 (as well as subject matter of one or more of any combination of examples 2-4), wherein the rigid or semi-rigid surface comprises a flat surface opposite of the at least one surface aperture.

Example 6

The device of example 1 (as well as subject matter of one or more of any combination of examples 2-5), further comprising instructional materials on the rigid or semi-rigid surface.

Example 7

The device of example 6 (as well as subject matter of one or more of any combination of examples 2-6), wherein the instructional materials comprise a relief mold.

Example 8

The device of example 7 (as well as subject matter of one or more of any combination of examples 2-7), wherein the relief mold comprises multiple colors for understanding.

Example 9

The device of example 5 (as well as subject matter of one or more of any combination of examples 2-8), wherein the instructional materials comprise printing on the rigid or semi rigid surface.

Example 10

The device of example 5 (as well as subject matter of one or more of any combination of examples 2-9), wherein the instructional materials comprise a decal or sticker.

Example 11

The device of example 1 (as well as subject matter of one or more of any combination of examples 2-10), wherein the rigid or semi-rigid surface comprises a container.

Example 12

The device of example 11 (as well as subject matter of one or more of any combination of examples 2-10), wherein the container has one open end.

Example 13

The device of example 12 (as well as subject matter of one or more of any combination of examples 2-11), further comprising a repeatably removeable lid.

Example 14

The device of example 11 (as well as subject matter of one or more of any combination of examples 2-10 or 12-13), further comprising a bottom aperture in the bottom of the container and a plug to close the bottom aperture.

Example 15

The device of example 1 (as well as subject matter of one or more of any combination of examples 2-14), wherein the at least one diaphragm is comprised of two or more layers.

Example 16

The device of example 1 (as well as subject matter of one or more of any combination of examples 2-15), wherein the at least one diaphragm is replaceable.

Example 17

The device of example 1 (as well as subject matter of one or more of any combination of examples 2-16), wherein the at least on diaphragm comprises a grommet.

Example 18

The device of example 1 (as well as subject matter of one or more of any combination of examples 2-17), wherein the at least one diaphragm dilates on insertion of the tracheotomy tube.

Example 19

The device of example 1 (as well as subject matter of one or more of any combination of examples 2-18), wherein the at least one diaphragm aperture is coaxial with the at least one surface aperture.

Example 20

The device of example 1 (as well as subject matter of one or more of any combination of examples 2-19), wherein the at least one diaphragm aperture comprise a slit valve.

Example 21

The device of example 1 (as well as subject matter of one or more of any combination of examples 2-20), wherein the rigid or semi-rigid surface is opaque.

Example 22

The device of example 1 (as well as subject matter of one or more of any combination of examples 2-21), wherein the device is configured to be portable.

Example 23

The device of example 1 (as well as subject matter of one or more of any combination of examples 2-22), wherein the device is provided as a kit with any one or a combination of the following: cuffed tracheotomy tube, plastic corrugated tubing, tracheostomy tube ties, drain sponge, syringe, forceps, water based surgical lubricant, simulated sputum, tubing, tubing adapter, mechanical test lungs, or a manual ventilation device.

Example 24

The device of example 11 (as well as subject matter of one or more of any combination of examples 2-10 and 12-23), wherein the container is configured to enclose any one or a combination of the following: cuffed tracheotomy tube, plastic corrugated tubing, tracheostomy tube ties, drain sponge, syringe, forceps, water based surgical lubricant, simulated sputum, tubing, tubing adapter, mechanical test lungs, or a manual ventilation device.

Example 25

The device of example 1 (as well as subject matter of one or more of any combination of examples 2-24), wherein the device is configured for training an operator in the care of the subject with a tracheostomy in any one or a combination of the following procedures: cleaning, cannulation, suction, mechanical ventilation, manual ventilation, proper cuff inflation, or general care.

Example 26

The device of example 1 (as well as subject matter of one or more of any combination of examples 2-25), wherein the rigid or semi-rigid surface is planar.

Example 27

A method for training an operator to care for a subject with a tracheostomy. The method may comprise: providing a rigid or semi-rigid surface; providing at least one diaphragm in communication with the rigid or semi-rigid surface, wherein the at least one diaphragm includes a diaphragm aperture; and inserting a tracheotomy tube or penetrating instrument into the at least one diaphragm aperture causing interference between the tracheotomy tube or penetrating instrument and the diaphragm, wherein the interference produces an initial resistance to insertion of the tracheotomy tube or penetrating instrument followed by lower resistance after the tracheotomy tube or penetrating instrument is displaced past a threshold of the at least one diaphragm aperture causing a sudden change in resistance.

Example 28

The method of using any of the devices or its components provided in any one or more of examples 1-26.

Example 29

The method of manufacturing any of the devices or its components provided in any one or more of examples 1-26.

REFERENCES

The following patents, applications and publications as listed below and throughout this document are hereby incorporated by reference in their entirety herein. The devices, systems, compositions, and methods of various embodiments of the invention disclosed herein may utilize aspects disclosed in the following references, applications, publications and patents and which are hereby incorporated by reference herein in their entirety (and which are not admitted to be prior art with respect to the present invention by inclusion in this section):
1. U.S. Patent Application Publication No. US 2012/0202180 A1, Stock, et al., "Training Device for Medical Procedures", Aug. 9, 2012.
2. U.S. Patent Application Publication No. US 2007/0218438 A1, Sanders, et al., "Tracheotomy Teaching Aid", Sep. 20, 2007.
3. U.S. Pat. No. 5,846,087, Scherer, A., "Anatomical Simulator and Method for Tracheostomy Tube Placement", Dec. 8, 1998.
4. U.S. Pat. No. 6,662,804 B2, Ortiz, A., "Tracheostomy Tube with Cuff on Inner Cannula", Dec. 16, 2003.
5. U.S. Pat. No. 4,817,598, LaBombard, D., "Tracheostomy Tube with Ring Pull Removable Inner Cannula", Apr. 4, 1989.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims (or disclosure herein), including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

I claim:

1. A kit for training an operator to care for a subject with a tracheostomy, said kit comprising a device comprising: a container or housing, wherein said container or housing comprises a rigid or semi-rigid surface; said container or housing having a bottom, wherein said bottom of said container or housing includes a bottom aperture configured to accommodate a plug that is configured to close said bottom aperture; said rigid or semi-rigid surface including at least one surface aperture; at least one diaphragm in communication with said rigid or semi-rigid surface; at least one diaphragm aperture in each of said at least one diaphragm; said at least one diaphragm aperture being smaller in size than said surface aperture; said at least one diaphragm aperture being configured for an interference fit with an outer portion of a tracheotomy tube or penetrating instrument; said interference fit configured to produce an initial resistance to insertion of said tracheotomy tube or penetrating instrument followed by lower resistance after said tracheotomy tube or penetrating instrument is displaced past a threshold of said at least one diaphragm aperture causing a sudden change in resistance; and said sudden change in resistance configured to provide said inexperienced operator with a tactile sensation similar to that of insertion of a tracheotomy tube into the tracheostomy of the subject; and wherein said kit is provided with said plug, wherein said plug is configured to close said bottom aperture.

2. The device of claim 1, wherein said container or housing is an open cylinder.

3. The device of claim 1, wherein said container or housing is an open semi-cylinder.

4. The device of claim 1, wherein said rigid or semi-rigid surface comprises a flat surface opposite of said at least one surface aperture.

5. The device of claim 1, further comprising instructional materials on said rigid or semi-rigid surface.

6. The device of claim 5, wherein said instructional materials comprise a relief mold.

7. The device of claim 6, wherein said relief mold comprises multiple colors for understanding.

8. The device of claim 4, wherein said instructional materials comprise printing on said rigid or semi rigid surface.

9. The device of claim 4, wherein said instructional materials comprise a decal or sticker.

10. The device of claim 1, wherein said container or housing has one open end.

11. The device of claim 10, further comprising a repeatably removeable lid configured to be disposed on said open end of said container.

12. The device of claim 1, wherein said at least one diaphragm is comprised of two or more layers.

13. The device of claim 1, wherein said at least one diaphragm is replaceable.

14. The device of claim 1, wherein said at least on diaphragm comprises a grommet.

15. The device of claim 1, wherein said at least one diaphragm dilates on insertion of said tracheotomy tube.

16. The device of claim 1, wherein said at least one diaphragm aperture is coaxial with said at least one surface aperture.

17. The device of claim 1, wherein said at least one diaphragm aperture comprises a slit valve.

18. The device of claim 1, wherein said rigid or semi-rigid surface is opaque.

19. The device of claim 1, wherein said device is configured to be portable.

20. The device of claim 1, wherein said kit is provided with any one or a combination of the following: cuffed tracheotomy tube, plastic corrugated tubing, tracheostomy tube ties, drain sponge, syringe, forceps, water based surgical lubricant, simulated sputum; tubing; tubing adapter, mechanical test lungs, or a manual ventilation device.

21. The device of claim 1, wherein said container is configured to enclose any one or a combination of the following: cuffed tracheotomy tube, plastic corrugated tubing, tracheostomy tube ties, drain sponge, syringe, forceps, water based surgical lubricant, simulated sputum, tubing, tubing adapter, mechanical test lungs, or a manual ventilation device.

22. The device of claim 1, wherein said device is configured for training an operator in the care of the subject with a tracheostomy in any one or a combination of the following procedures: cleaning, cannulation, suction, mechanical ventilation, manual ventilation, proper cuff inflation, or general care.

23. The device of claim 1, wherein said rigid or semi-rigid surface is planar.

* * * * *